Feb. 20, 1962 R. A. CLINE ETAL 3,022,390
CONDITION MONITORING DEVICE
Filed March 27, 1959 2 Sheets-Sheet 1
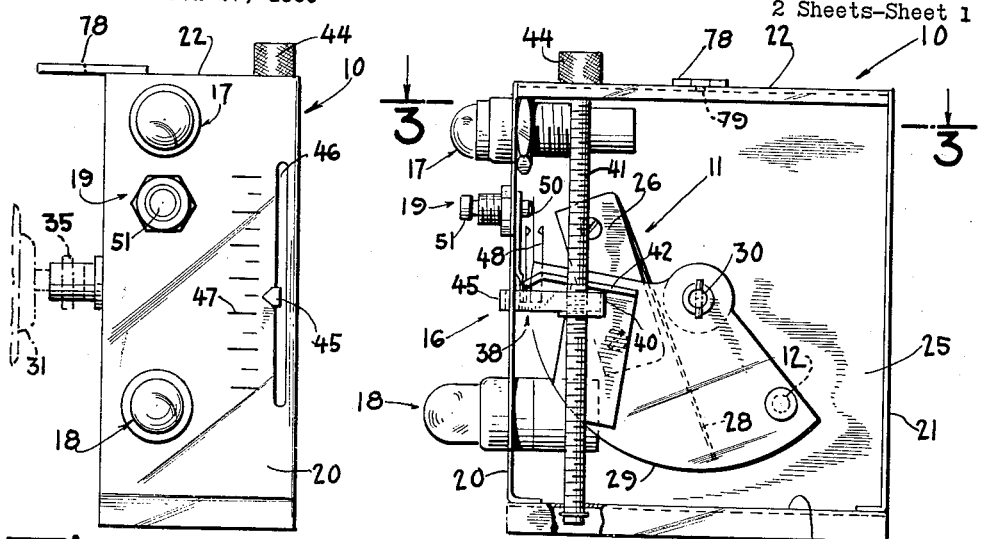
Fig.1
Fig.2
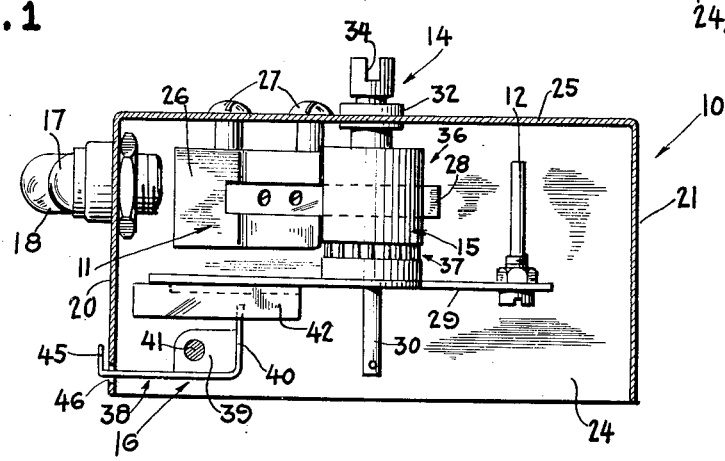
Fig.3
INVENTORS
Robert A. Cline
BY Eli Levy
J. William Carson
ATTORNEY Feb. 20, 1962 R. A. CLINE ETAL 3,022,390
CONDITION MONITORING DEVICE
Filed March 27, 1959 2 Sheets-Sheet 2

INVENTORS.
Robert A. Cline
Eli Levy
BY
J. William Carson
ATTORNEY 3,022,390
CONDITION MONITORING DEVICE
Robert A. Cline, Noroton, Conn., and Eli Levy, Bloomfield, N.J., assignors to Walter Kidde & Company, Inc., Belleville, N.J., a corporation of New York
Filed Mar. 27, 1959, Ser. No. 802,544
4 Claims. (Cl. 200—38)

The present invention relates to a condition monitoring device, and, more particularly, to a device for giving an indication that a certain condition exists and for giving another indication in the event that the condition continues to exist beyond a predetermined interval of time.

The device in accordance with the present invention may be used for monitoring a wide variety of conditions, but one advantageous use thereof by way of example, is in connection with monitoring the refrigeration of perishable products.

A common practice in operating refrigerating units for enclosures in warehouses, markets and stores is to automatically shut down the unit and defrost the same for a permissible interval of time during the night or some other time when the enclosures are not in use and are not exposed to warm air, and to start the units again before the temperature in the enclosures has been of a higher value for more than a permissible interval of time.

Thus, for example, after a unit has been shut down for about one hour and has been defrosting, the temperature in the enclosure rises a few degrees which is tolerable and the temperature is lowered again as refrigeration is restored. However, if, by reason of some failure in the proper functioning of the unit or its control, refrigeration is not restored within two hours, for example, the temperature in the enclosure rises above a permissible value which would endanger perishable goods stored in the enclosure should that temperature persist.

The present invention aims to provide a device which gives an indication that defrosting is taking place, gives another indication when refrigeration is restored, and gives still another indication such as a danger signal in the event refrigeration is not restored within a predetermined interval of time. Such indications or signals may be given locally to an engineer or watchman in attendance on the premises or may be given at a remote location such as a central station which renders watching services for a fee.

Accordingly, an object of the present invention is to provide such devices which are simple and economical in construction and reliable in operation.

Another object is to provide such devices which are adapted to be arranged in groups for monitoring a group of refrigerating units operated to maintain the same or different temperatures in a group of enclosures.

A further object is to provide such devices which are readily adjusted to vary the interval of time in which the danger signal is given should refrigeration be not restored.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 1 is a front elevational view of a device in accordance with the present invention.

FIG. 2 is a side elevational view of the device shown in FIG. 1.

FIG. 3 is a sectional view taken along the line 3—3 in FIG. 2.

Figure 4:
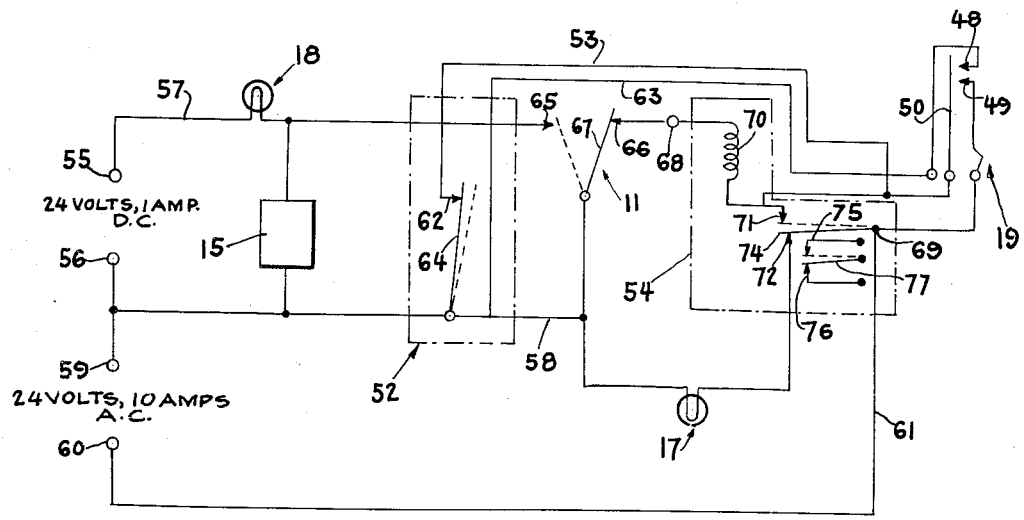
FIG. 4 is a wiring diagram for the device.

Referring to FIGS. 1 to 3 of the drawings in detail, there is shown a device which generally comprises a casing 10, a switch 11, a movable switch operating member 12, drive means 14, a clutch 15 for connecting the drive means to move the switch operating member, an arrangement 16 for predetermining the distance and time the switch operating member must be moved before being placed into switch operating position, signal lamps 17 and 18 for giving various indications as will be explained later, and a resetting switch 19. The electrical connections and wiring are not shown in FIGS. 1 to 3, but are shown in FIG. 4 and will be described with reference thereto.

The casing 10, as shown, is in the form of a relatively narrow rectangular box having a front 20, a back 21, a top 22, a bottom 24, and a side 25, the other side being open or having a removable cover thereon (not shown).

The switch preferably is of the single pole double throw type, such as a micro-switch including a housing 26 secured by screws 27 to the back 21 of the casing 10 and an operating arm 28 normally biased in one position and operable by the member 12 as about to be described.

The switch operating member 12 is preferably mounted for rotative movement by a rotatable member such as a sector-shaped plate member 29. The member 12 is an extension such as a rod or a pin secured to the plate member 29, adjacent one radius thereof, extends parallel to the axis of rotation of the plate member and extends transversely with respect to the switch operating arm 28, with the arm 28 in the path of rotative movement of the member 12.

The drive means 14 include a drive shaft 30 and a constant speed motor 31 such as an electric clock motor adapted to make one rotation every 24 hours. As viewed in FIG. 3, the upper end of the drive shaft is journalled for rotation in a bearing 32 supported by the back 21 of the casing 10 and its fore end has a radially extending slot 34 for receiving a radially extending pin 35 on the motor output shaft.

The clutch 15 is of the conventional solenoid operable type and includes a section 36 mounted on the drive shaft 30 for rotation therewith and a second section 37 secured to the plate member 29 adapted to be placed in driven connection with the drive shaft 30 upon operation of the clutch solenoid.

The clutch section 37 is mounted on the drive shaft adjacent its lower end (as viewed) in a manner to prevent axial movement thereon and to permit the shaft to normally rotate with respect thereto.

The arrangement 16 for determining the initial position of the switch operating member 12 comprises a member 38 provided with a nut portion 39 and a stop portion 40, a screw threaded vertical rod 41 mounted in the top and bottom of the casing for rotation and threaded through the nut portion, an abutment 42 on the plate member 29 adjacent its other radius adapted to engage the stop portion whereby the plate member is supported in its initial or inactive position, and a knob 44 at the upper end of the rod 41 for turning the same to raise or lower the abutment portion. Preferably, the member 38 also has a pointer 45 which extends through a vertical slot 46 in front 20 of the casing 10 and cooperates with indicia 47 on the front to indicate the length of time it will take for the switch operating member 12 to travel from its initial position to its switch operating position. By turning the knob 44, this time interval can be varied within wide limits, for example, from fifteen minutes to several hours.

The plate member 29 may be urged into its initial or at rest position by a spring or other suitable means, for example, as shown the abutment 42 on the member 29 serves as a weight which causes the plate member to rotate counter-clockwise when the clutch is released to its initial position.

The lamps 17 and 18 are mounted in a conventional manner on the front of the casing. Preferably, the lamps are of different colors to indicate different signals. For example, the lamp 17 is red to indicate danger and the lamp 18 is green to indicate that normal operation is taking place.

The resetting switch 19 includes two contacts 48 and 49 (of which only the contact 48 can be seen in FIG. 2), an arm 50 for engaging both contacts (FIG. 4) and a push button 51 on the front of the casing for operating the switch arm.

In FIG. 4, a wiring diagram is shown of a circuit in which the switch 11, the clutch 15, the lamps 17 and 18, and the switch 19 are connected together with a thermostat 52 and a relay 54. The circuit is powered by a source of 24 volts, 1 ampere direct current supplied by terminals 55 and 56 to lines 57 and 58, and a source of 24 volts, 10 ampere alternating current supplied by terminals 59 and 60 to lines 58 and 61.

The clutch 15 is connected across the lines 57 and 58, and the lamp 18 is connected in the line 57 in series with the clutch solenoid. The thermostat 52 includes a single pole, single throw switch provided by a contact 62 and an arm 64 which is connected across the lines 57 and 58 and normally is closed to shunt out the clutch 15 and enable the lamp 18 to be illuminated. The arm 50 and the contact 48 of the resetting switch 19 are also connected across the lines 57 and 58 by conductors 53 and 63, and, upon engagement of the arm and the contact, the clutch 15 also can be shunted out for the purpose to be explained later.

The switch 11 includes a contact 65 connected to the line 57, a contact 66 connected to one terminal of the relay 54 as about to be described, and an arm 67 connected to the line 58 normally engaging the contact 66 and adapted to be moved into engagement with the contact 65 by the switch operating member 12 and the arm 28 to shunt out the clutch 15 and the lamp 18.

The relay 54 includes a terminal 68 to which the switch contact 66 is connected, a terminal 69 connected to the line 61, a coil 70 connected between the terminal 68 and a switch contact 71, a switch contact 72 connected to the line 58, and switch arm 74 connected to the terminal 69 and operable by the relay coil to determine its position with respect to the contacts 71 and 72. The relay also includes switch contacts 75 and 76 and a switch arm 77 operable by the relay coil for controlling an external circuit for giving an alarm or other signal at a remote location such as a central watching station.

The relay switch contact 71 is connected to the arm 50 of the resetting switch 19 and the switch contact 49 for the arm is connected to the line 61, whereby under certain conditions the relay can be energized by its connection across the lines 58 and 61.

The lamp 17 is adapted to be connected across the lines 58 and 61 through the relay terminal 69, the contact 72 and the switch arm 74.

In operation, when the proper temperature is being maintained in the refrigerator enclosure, the thermostat switch 52 is closed; and, with the power sources connected to the circuit, the clutch 15 is shunted out, the lamp 18 is illuminated at full brightness, the relay 54 will be de-energized and the lamp 17 will be on because of the dropped out position of the relay switch arm 74. Upon momentarily closing the resetting switch 19 (arm 50 and contact 49), the relay is energized and the relay switch arm 74 is pulled up into engagement with its contact 71, whereupon the lamp 17 goes off and the relay is energized by the connection of its terminal 68 to the line 58 through the contact 66 and the switch arm 67 and the connection of its terminal 69 to the line 61.

The switch arms 64 and 67 are now in their full line position, and the switch arm 74 is now in its broken line position as shown. Since the lamp 17 is off and the lamp 18 is on bright, the device indicates that refrigeration is on and that the proper temperature is being maintained.

When the refrigerating unit is shut down and goes into a defrosting cycle, the temperature rises and the thermostat switch opens as its arm 64 goes to its broken line position. This removes the shunt across the clutch 15, whereupon the clutch is energized to place the plate member 29 in driven connection with continuously rotating drive shaft 30 driven by the motor 31 and the resistance of the clutch solenoid dims the lamp 18 to indicate that the temperature has risen either due to defrosting or otherwise. As the clutch remains energized, the plate member 29 and the switch operating member 12 thereon are gradually rotated clockwise from their initial or at rest position shown in FIG. 2 towards the switch operating position.

In the event refrigeration is restored and the thermostat switch recloses, the clutch 15 is shunted out again, whereupon the lamp 18 brightens to indicate that defrosting has taken place without incident and the plate member drops to its initial position by counter-clockwise rotation thereof due to its unbalanced condition.

In the event the thermostat switch remains open, rotation of the plate member 29 continues until the member 12 contacts the arm 28 to operate the switch 11, whereby its arm 67 goes from its full line position to its broken line position. When this occurs, the relay arm 74 drops out because removal of the switch arm 67 from its contact 66 de-energizes the relay coil 70, the lamp 17 is connected across the lines 58 and 61 by the contact 72 and the arm 74 which now are engaged, and the external circuit is operated to give an alarm simultaneously. The lamp 17 indicates that an unwanted condition now exists and stays on until the resetting switch 19 is operated as previously described to re-energize the relay.

Also, in the circuit as shown, when the switch arm 67 is moved into its broken line position and engages its contact 65, the clutch 15 is momentarily shunted to enable the plate member 29 to fall back slightly, whereby the member 12 cannot be over-driven and damage the switch 11 or the switch operating member 28. In cases where automatic declutching is not provided for in this manner, the same result is attained by momentarily closing the resetting switch 19 (arm 50 and contact 48) to shunt the clutch.

After an alarm has been given and an investigation determines that the temperature in the refrigerator enclosure is still at a safe level and that the refrigerating unit appears to be functioning properly except that the defrosting operation was sluggish, the plate member 29 can be reset to operate through a shorter cycle and the relay 54 is reset to again give an alarm when the extra time allowed for refrigeration to be restored has run out. In such a case, the engineer or watchman of course remains in attendance to make sure that emergency measures can be taken before a dangerous temperature condition exists in the refrigerator enclosure.

Figure 5:
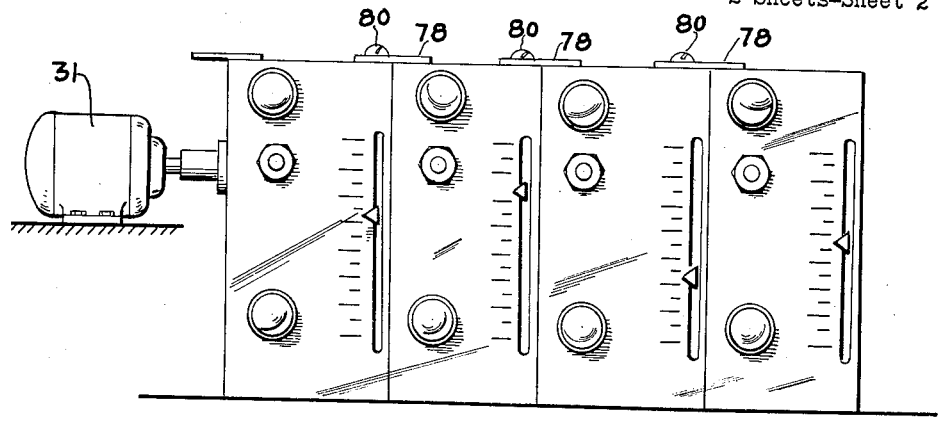
FIG. 5 is a front elevational view of a group of devices operated by a common drive.

In FIG. 5, a plurality of devices are shown arranged side by side in a group and are all driven by the motor 31. This is made possible by providing each drive shaft 30 with a slot 34 at one end and a pin like the motor drive shaft pin 35 which fits into the slot of an adacent drive shaft. The devices are held in alignment by butting the top and bottom of adjacent devices and by providing each top with a slotted extension 78 at one side and a screw hole 79 at the other side for receiving a screw 80 adapted to secure the extension of an adjacent device. In this manner, the devices can be compactly arranged at the control station of a warehouse having a number of refrigerating units in operation. A single motor drives as many as twelve such devices, and such device can operate independently of the others.

While the present invention has been described in connection with refrigerating units, it will be apparent that other conditions can be monitored simply by replacing the thermostat with an instrument which can detect the condition to be monitored. For example, the device can be used for timing the temperature below a desired value, insufficient or excessive humidity, fluid flow or absence thereof or liquid level, lack or presence of light and many other conditions which can be detected by instruments capable of operating a switch such as that of the thermostat.

From the foregoing description, it will be seen that the present invention provides a simple, practical and reliable device for monitoring a wide variety of conditions.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. A condition monitoring device comprising a casing, a unidirectional rotating drive shaft in said casing, a switch mounted in said casing in a fixed position, a switch actuating member mounted for rotation on said shaft adjacent said switch and extending radially outwardly from one side of said shaft and having a switch operating element and an abutment thereon, a clutch for coupling said member to said shaft, and a stop in said casing for engaging said abutment and allowing the same to rest thereon to support said member in a predetermined position when unclutched and to thereby position the center of gravity of said member in a horizontal plane below said shaft, said drive shaft being adapted to rotate said member to position its center of gravity above that plane when said clutch is effective and to position said element of said member to operate said switch upon rotation of said member through a predetermined angle, whereby said member is adapted to return to its supported position by gravity when said clutch is rendered ineffective.

2. A condition monitoring device according to claim 1, wherein said said stop is provided with nut means, a substantially vertical screw is threaded through said nut means and is rotatably mounted in said casing with one end extending outwardly thereof, and a manually engaged element is secured to said screw at its outwardly extending end.

3. A condition monitoring device according to claim 1, wherein said member is a sector-shaped plate, and said switch operating element is adjacent one radius of said plate and said abutment is adjacent the other radius thereof.

4. A condition monitoring device according to claim 2, wherein said casing is formed with a vertical slot adjacent said screw and has indicia adjacent said slot at the exterior thereof, and said nut means has a pointer thereon extending through said slot to provide a visible indication of the position of said stop by reference to said indicia and said pointer.

References Cited in the file of this patent

UNITED STATES PATENTS

| | | |
|---|---|---|
| 2,202,721 | Andersen | May 28, 1940 |
| 2,223,207 | Ellis | Nov. 26, 1940 |
| 2,231,116 | Goodrich | Feb. 11, 1941 |
| 2,429,083 | Vetter | Oct. 14, 1947 |
| 2,467,944 | Munson | Apr. 19, 1949 |
| 2,542,824 | Manson et al. | Feb. 20, 1951 |
| 2,592,705 | Jewell et al. | Apr. 15, 1952 |
| 2,880,288 | Rosenberg | Mar. 31, 1959 |